(12) United States Patent
Long

(10) Patent No.: US 7,577,749 B1
(45) Date of Patent: Aug. 18, 2009

(54) EMULATION OF PERSISTENT HTTP CONNECTIONS BETWEEN NETWORK DEVICES

(75) Inventor: James Long, Sunnyvale, CA (US)

(73) Assignee: UX Ltd., George Town, Grand Cayman (KY)

( * ) Notice: Subject to any disclaimer, the term of this patent is extended or adjusted under 35 U.S.C. 154(b) by 698 days.

(21) Appl. No.: 11/294,905

(22) Filed: Dec. 5, 2005

Related U.S. Application Data

(60) Provisional application No. 60/633,251, filed on Dec. 3, 2004, provisional application No. 60/641,648, filed on Jan. 4, 2005, provisional application No. 60/671,689, filed on Apr. 15, 2005.

(51) Int. Cl.
*G06F 15/16* (2006.01)
*G06F 12/00* (2006.01)

(52) U.S. Cl. ........................ 709/230; 709/218

(58) Field of Classification Search ............... 709/203, 709/227, 217, 218, 225, 226, 250
See application file for complete search history.

(56) References Cited

U.S. PATENT DOCUMENTS

| | | | |
|---|---|---|---|
| 4,454,593 A | 6/1984 | Fleming et al. | |
| 4,642,790 A | 2/1987 | Minshull et al. | |
| 4,858,114 A | 8/1989 | Heath et al. | |
| 5,442,791 A | 8/1995 | Wrabetz et al. | |
| 5,502,839 A | 3/1996 | Kolnick | |
| 5,551,030 A | 8/1996 | Linden et al. | |
| 5,577,188 A | 11/1996 | Zhu | |
| 5,608,426 A | 3/1997 | Hester | |
| 5,608,872 A | 3/1997 | Schwartz et al. | |
| 5,623,603 A | 4/1997 | Jiang et al. | |
| 5,649,104 A | 7/1997 | Carleton et al. | |
| 5,668,997 A | 9/1997 | Lynch-Freshner et al. | |
| 5,732,270 A | 3/1998 | Foody et al. | |
| 5,761,419 A | 6/1998 | Schwartz et al. | |
| 5,787,413 A | 7/1998 | Kauffman et al. | |
| 5,819,038 A | 10/1998 | Carleton et al. | |

(Continued)

OTHER PUBLICATIONS

Evans, H. et al., "Zones, Contracts and Absorbing Change: An Approach to Software Evolution," ACM SIGPLAN Notices, Proceedings of the 14th ACM SIGPLAN Conference on Object-Oriented Programming, Systems, Languages, and Applications OOPSLA '99, Oct. 1999, pp. 415-434, vol. 34, Issue 10.

(Continued)

*Primary Examiner*—Zarni Maung
(74) *Attorney, Agent, or Firm*—Fenwick & West LLP

(57) ABSTRACT

Systems and methods for emulating a persistent connection using, for example, hypertext transfer protocol (HTTP) transactions over a transmission control protocol (TCP) connection. The persistent connection is maintained by adjusting content length values in HTTP requests and/or HTTP responses. The content length values are associated with methods such as GET and POST actions. The values of the content length are determined in order to keep the connection open for an estimated period of time. Prior to expiration of the time period, a new HTTP request or response is sent in order to keep the connection open for an additional period. If the connection is prematurely closed, the estimated time period is reduced and/or the content length value can be increased. A network conditions detector determines characteristics of the network such as bandwidth for use when determining the estimated time period and the content length value.

21 Claims, 6 Drawing Sheets

U.S. PATENT DOCUMENTS

| | | | |
|---|---|---|---|
| 5,867,661 | A | 2/1999 | Bittinger et al. |
| 5,899,810 | A | 5/1999 | Smith |
| 5,903,725 | A | 5/1999 | Colyer |
| 5,920,725 | A | 7/1999 | Ma et al. |
| 5,925,100 | A | 7/1999 | Drewry et al. |
| 5,941,988 | A | 8/1999 | Bhagwat et al. |
| 5,943,496 | A | 8/1999 | Li et al. |
| 5,960,173 | A | 9/1999 | Tang et al. |
| 5,961,582 | A | 10/1999 | Gaines |
| 5,961,594 | A | 10/1999 | Bouvier et al. |
| 5,968,127 | A | 10/1999 | Kawabe et al. |
| 5,987,523 | A | 11/1999 | Hind et al. |
| 5,999,972 | A | 12/1999 | Gish |
| 6,003,065 | A | 12/1999 | Yan et al. |
| 6,003,084 | A | 12/1999 | Green et al. |
| 6,006,230 | A | 12/1999 | Ludwig et al. |
| 6,006,278 | A | 12/1999 | Cottrill |
| 6,012,083 | A | 1/2000 | Savitzky et al. |
| 6,014,651 | A | 1/2000 | Crawford |
| 6,014,702 | A | 1/2000 | King et al. |
| 6,018,805 | A | 1/2000 | Ma et al. |
| 6,035,324 | A | 3/2000 | Chang et al. |
| 6,047,314 | A | 4/2000 | Pommier et al. |
| 6,049,673 | A | 4/2000 | McComb et al. |
| 6,070,184 | A | 5/2000 | Blount et al. |
| 6,148,340 | A | 11/2000 | Bittinger et al. |
| 6,192,418 | B1 | 2/2001 | Hale et al. |
| 6,226,690 | B1 | 5/2001 | Banda et al. |
| 6,240,447 | B1 | 5/2001 | Banga et al. |
| 6,249,281 | B1 | 6/2001 | Chen et al. |
| 6,331,855 | B1 | 12/2001 | Schauser |
| 6,343,313 | B1 | 1/2002 | Salesky et al. |
| 6,356,933 | B2 | 3/2002 | Mitchell et al. |
| 6,370,552 | B1 | 4/2002 | Bloomfield |
| 6,370,570 | B1 | 4/2002 | Muir et al. |
| 6,437,803 | B1 | 8/2002 | Panasyuk et al. |
| 6,522,334 | B2 | 2/2003 | Schauser |
| 6,538,667 | B1 | 3/2003 | Duursma et al. |
| 6,567,813 | B1 | 5/2003 | Zhu et al. |
| 6,601,087 | B1 | 7/2003 | Zhu et al. |
| 6,629,138 | B1 | 9/2003 | Lambert et al. |
| 6,654,032 | B1 | 11/2003 | Zhu et al. |
| 6,754,847 | B2 | 6/2004 | Dalal et al. |
| 6,782,411 | B2 | 8/2004 | Navare et al. |
| 6,789,119 | B1 | 9/2004 | Zhu et al. |
| RE38,609 | E | 10/2004 | Chen et al. |
| 7,069,298 | B2 | 6/2006 | Zhu et al. |
| 7,346,695 | B1 * | 3/2008 | Masters ............... 709/228 |
| 2002/0000990 | A1 | 1/2002 | Schauser |
| 2002/0040400 | A1 * | 4/2002 | Masters ............... 709/228 |
| 2002/0133630 | A1 | 9/2002 | Navare et al. |
| 2002/0156901 | A1 * | 10/2002 | Erickson et al. ......... 709/227 |
| 2002/0194272 | A1 | 12/2002 | Zhu |
| 2003/0050966 | A1 | 3/2003 | Dutta et al. |
| 2003/0051037 | A1 | 3/2003 | Sundaram et al. |
| 2003/0061355 | A1 * | 3/2003 | Yang et al. ............. 709/227 |
| 2003/0101267 | A1 | 5/2003 | Thompson et al. |
| 2003/0191988 | A1 | 10/2003 | Dalal et al. |
| 2003/0220973 | A1 | 11/2003 | Zhu et al. |
| 2004/0162076 | A1 * | 8/2004 | Chowdry et al. ......... 455/445 |
| 2005/0010639 | A1 | 1/2005 | Long et al. |
| 2005/0102611 | A1 * | 5/2005 | Chen .................. 715/513 |
| 2007/0079353 | A1 | 4/2007 | Boortz |

OTHER PUBLICATIONS

Access Infrastructure For The On-Demand Enterprise, GoToMeeting, Citrix Online, 2005, [online] [Retrieved on Jan. 4, 2006] Retrieved from the Internet <URL:http://www.gotomeeting.com/default/downloads/pdf/p/GoToMeeting_Fact_Sheet.pdf>.

Microsoft Office Online, Live Meeting Overview, Microsoft Corporation, 2006, [online], [Retrieved on Jan. 4, 2006] Retrieved from the Internet<URL:http://www.microsoft.com/office/livemeeting/prodinfo/overview.mspx>.

"A Primer on the T.120 Series Standards," DataBeam Corporation, 1995, Updated May 14, 1997, pp. 1-16.

Web Conferencing, Video Conferencing and Online Meeting Services, Deliver Compelling Online Events, WebEx Communications, Inc., 1999-2006, [online] [Retrieved on Jan. 4, 2006] Retrieved from the Internet <URL:http://webex.com/solutions/ec_features.html>.

Web Conferencing, Video Conferencing and Online Meeting Services, Meet With Anyone, Anywhere, Anytime, WebEx Communications, Inc., 1999-2006, [Online] [Retrieved on Jan. 4, 2006] Retrieved from the Internet <URL:http://webex.com/solutions/mc_features.html>.

WebEx MediaTone Network, WebEx Communications Inc., [online] [Retrieved on Jan. 4, 2006] Retrieved from the Internet <URL:http://webex.com/pdf/wp_mediatone.pdf>.

Webex, Reach the World, WebEx Communications, Inc., 2005, [online] [Retrieved on Jan. 4, 2006] Retrieved from the Internet <URL:http://webex.com/pdf/webex_capabilities.pdf>.

WebEx SMARTtech Security, WebEx Communications Inc., 2005, [online] [Retrieved on Jan. 4, 2006] Retrieved from the Internet <URL:http://webex.com/pdf/wp_smart_security.pdf>.

* cited by examiner

EMULATION OF PERSISTENT HTTP CONNECTIONS BETWEEN NETWORK DEVICES

CROSS-REFERENCE TO RELATED APPLICATION

This application claims priority under 35 U.S.C. §119(e) to: U.S. Provisional Patent Application No. 60/633,251 entitled "Quality of Service Maintenance for a Peer-to-Peer Network Download", filed on Dec. 3, 2004, by James Long; U.S. Provisional Patent Application No. 60/641,648 entitled "Method to Allow Remote Computers to Annotate for a Peer-To-Peer Network Download", filed on Jan. 4, 2005, by James Long; and U.S. Provisional Patent Application No. 60/671,689 entitled "Independent Host Architecture for Indirect Connection for Peer-to-Peer Network Download", filed on Apr. 15, 2005, by James Long, the entire contents of each being herein incorporated by reference.

FIELD OF THE INVENTION

The present invention relates generally to networks, and more specifically, to emulating a persistent HTTP connection between nodes on a network.

BACKGROUND

Hypertext transfer protocol (HTTP) is an important standard for transferring data over the World Wide Web (WWW). In contrast to Transmission Control Protocol (TCP) which operates independent of the actual data being transferred, HTTP is an application layer protocol in the OSI (Open Systems Interconnection) Model which operates independent of how the data is transferred. Generally, HTTP allows clients to communicate with network resources such as servers or other clients. For example, a client can request a web page stored on the server. To do so, a client makes a request to a server which sends a response.

Version 1.0 of the HTTP protocol (HTTP 1.0) is a commonly used HTTP protocol. The request/response paradigm used by HTTP 1.0 has four stages: establish TCP connection, client HTTP request, server HTTP response, and terminate TCP connection. Because HTTP is a stateless protocol, it does not maintain a connection after the four-stage process has taken place. Therefore, the connection must be reestablished for another transaction. Hence, communications using HTTP 1.0 can be very slow since a new TCP connection is open and then closed each time a client generates a new HTTP request. This can lead to poor performance for real-time data applications such as conferencing applications.

One technique to address this limitation places a Keep Alive header within an HTTP response or a request. The Keep Alive header is not defined by HTTP 1.0, and indicates that the connection should remain open for a certain number of HTTP transactions. Although the Keep Alive technique attempts to provide a connection that lasts beyond a single transaction, there are problems associated with the Keep Alive technique. First, many clients and servers do not support the Keep Alive technique, especially those using HTTP 1.0. Second, the Keep Alive technique can be unstable, as the Keep-Alive connections between a client computer and a server computer can unexpectedly terminate. For example, if a Keep Alive header is not included in each request and response sent between the client and server, the connection can be closed. Third, firewalls and proxy servers often separate clients and servers from outside networks, and prevent Keep Alive connections from being established or unexpectedly close the Keep Alive connections after they are established. Thus there is no guarantee that the Keep Alive technique will work with existing clients and servers.

Thus, there is a need for systems and methods to emulate or establish persistent HTTP connections to overcome the limitations described above. Moreover, the systems and methods should be platform-independent in that client and servers need not specifically support persistent connections.

SUMMARY

The present invention addresses the above needs by providing systems and methods for emulating a persistent connection. In one embodiment, a persistent hypertext transfer protocol (HTTP) connection is maintained by adjusting content length values in HTTP requests and/or HTTP responses. Generally, a content length value is a header included in the HTTP request or response that indicates a length of a message data. The message data can include application data associated with a method such as a GET or POST action. The values of the content length are determined in order to keep the HTTP connection open for an estimated period of time. Prior to expiration of the time period, a new HTTP request or response is sent in order to keep the HTTP connection open for an additional period. If the HTTP connection is prematurely closed, the estimated time period can be reduced or the content length value can be increased.

In one embodiment, a system comprises a client and a server, at least one of which includes a persistent connection module to maintain the persistent connection. The persistent connection module can initiate the persistent connection for an application such as a conferencing application that requires high bandwidth data transfers with low latency (e.g., for real-time performance).

In another embodiment, the persistent connection module also comprises a network conditions detector. The network conditions detectors determines characteristics of the network such as bandwidth using various techniques such as pinging. The characteristics are fed back to the persistent connection module for use when determining the estimated time period and the content length value.

Advantageously, an application, such as a conferencing application, can have improved performance by operating as though a persistent connection exists (e.g., by providing high resolution video). The persistent connection is platform-independent in that it can be established regardless of support for persistent connection on the client or server via Keep-Alive or other techniques requiring explicit support. Furthermore, the persistent connection can be attained despite the presence of proxy servers, firewalls or other obstacles.

The features and advantages described in the specification are not all inclusive and, in particular, many additional features and advantages will be apparent to one of ordinary skill in the art in view of the drawings, specifications, and claims. Moreover, it should be noted that the language used in the specification has been principally selected for readability and instructional purposes and may not have been selected to delineate or circumscribe the inventive matter.

BRIEF DESCRIPTION OF THE DRAWINGS

The teachings of the present invention can be readily understood by considering the following detailed description in conjunction with the accompanying drawings.

DETAILED DESCRIPTION

Systems and methods for emulating a persistent connection are described. Similar or like reference numbers may be used in the figures and may indicate similar or like functionality. In one embodiment, a persistent hypertext transfer protocol (HTTP) connection is maintained by adjusting content length values in HTTP requests and/or HTTP responses. As used herein, a persistent HTTP connection refers to HTTP transactions made over an underlying connection, such as a Transmission Control Protocol (TCP) connection, without the need for reestablishing the connection for new transactions. The transactions include HTTP requests and HTTP responses implemented in data packets having metadata and message data fields. Generally, a content length value is metadata that indicates a length of a message data. The content length value can be expressed in code as a key/value pair corresponding to a description header (e.g., "content length") and a value (e.g., 3495). The message data can include application data associated with a method such as a GET or POST action (e.g., as used to retrieve a hypertext mark-up language, or HTML, page). Note that the use of HTTP transactions over the TCP protocol is merely exemplary, and that other embodiments can maintain persistent connections using alternative protocols.

Figure 1:
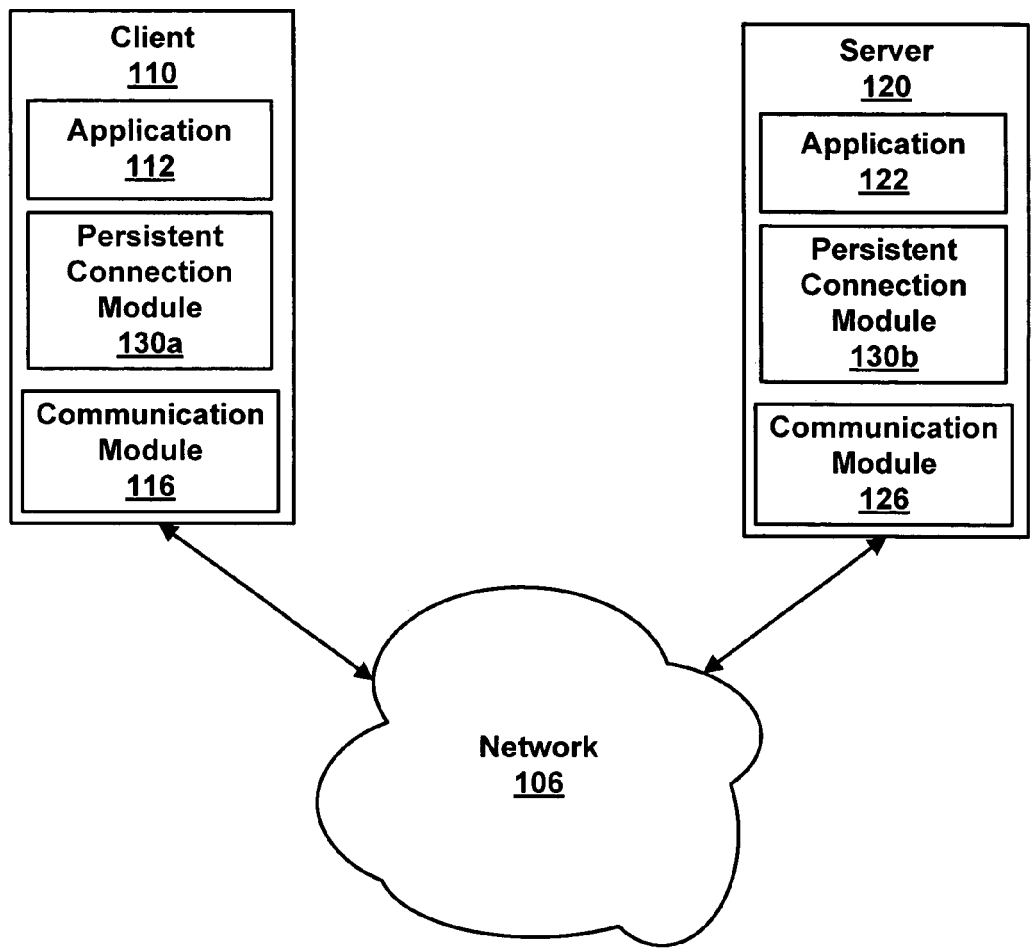
FIG. 1 is a block diagram illustrating a system for maintaining a persistent hypertext transfer protocol (HTTP) connection according to some embodiments of the present invention.

FIG. 1 is a block diagram of a system 100 for maintaining a persistent HTTP connection according to some embodiments of the present invention. The system 100 of FIG. 1 comprises a client 110 and a server 120 in communication through a network 106, but other embodiments can comprise additional clients, servers, and other network nodes. For example, the system 100 can include a firewall or proxy server.

The client 110 can be any type of electronic device that is capable of establishing a connection with the server 120 and exchanging data. For example, client 110 can be a desktop computer, a laptop computer, a personal digital assistant (PDA), or a cellular telephone. The client 110 further comprises an application 112, a persistent connection module 130a, and a communications module 116. In some embodiments, the client 110 can include additional components (not shown) such as a processor (e.g., an x86 platform processor or an ARM processor), a memory (e.g., an SRAM or DRAM, a hard disc, or a flash memory), and an operating system (e.g., a Windows OS, or a UNIX OS). The server 120 further comprises an application 122, a persistent connection module 130b, and a communications module 126. In some embodiments, the server 120 also stores web pages for access by the client 110, or hosts distributed applications such as video conferencing applications.

The applications 112, 122 can be any type of software and/or hardware (e.g., a web browser, a word processing application, a spreadsheet application, or a computer-aided drafting application). The applications 112, 122 can interact across the network 106 in a distributed computing environment with network resources and other applications. In one embodiment, the applications 112, 122 are independent of the underlying communications protocol, and instead, rely on the communications module 116 to provide a communication channel across the network 106. In some embodiments, the applications 112, 122 have high data rate and low latency requirements for optimal performance of, for example, a real-time application, a conferencing application (e.g., video or audio conferencing), a multimedia application, a data storage application, and the like. In one example, a video conferencing application can be set to a resolution and frame rate requiring a high rate of data transfer. Moreover, the related video feed has a better quality (e.g., less dropped frames) with high data-rate delivery.

The persistent connection modules 130a,b can be incorporated as part of the applications 112, 122 (e.g., a web browser), as part of the communications modules 116, 126 (e.g., a protocol application), or as an independent module. The persistent connection modules 130a,b can detect when the application 112, 122 is launched (e.g., using a daemon), in one embodiment, and is initiated by the application 112, 122 (e.g., using a function call) in another embodiment.

In one embodiment the persistent connection modules 130a,b maintain an HTTP connection between the client 110 and the server 120 until the connection is explicitly terminated (e.g., the application 112, 122 is shut down). In one embodiment, the persistent connection modules 130a,b maintain the connection by determining a value of the content length field to keep the connection open for a predetermined period of time (i.e., an estimated period). The connection can remain open regardless of how many HTTP transactions have occurred. Then, the persistent connection modules 130a,b continually send packets, having modified content length values, before the predetermined amount of time expires. The content length values can be implemented for example, in cooperation with the communications modules 116, 126, or by creating, intercepting, and modifying packets sent out by the communications modules, 116, 126.

In another embodiment, the persistent connection modules 130a,b detect whether the client 110 or the server 120 is still online before attempting to reestablish a closed connection. The persistent content modules 130a,b are described in more detail below with reference to FIG. 2.

The communications modules 116, 126 can include, for example, an Ethernet card, a wireless card (e.g., an IEEE 802.11 protocol), a network processor, a protocol application (e.g., an HTTP application), and the like. In one embodiment, the communications modules 116, 126 embed data from, for example, the applications 112, 122, into packets suitable for transport across the network 106 (e.g., see FIGS. 3a,b). For example, the communications module 116 can add TCP/IP headers, such as content length values, in accordance with layers of the OSI network stack. The network 106 can be a medium for transporting communications between the client 110 and the server 120 such as a data (e.g., the Internet, a LAN, a WAN, and the like) or a cellular network. In one embodiment, the network 106 provides connectionless communications channels for sending data packets with metadata and message data. Headers can be used to indicate a content length of the message data. Additionally, headers can indicate source and destination IP addresses, port numbers, time stamps, and the like. The network 106 can have dynamic conditions such as a current minimum bandwidth and maximum latency. The conditions can change based on a number of nodes accessing the network, types of data transfers, and the like.

Figure 2:
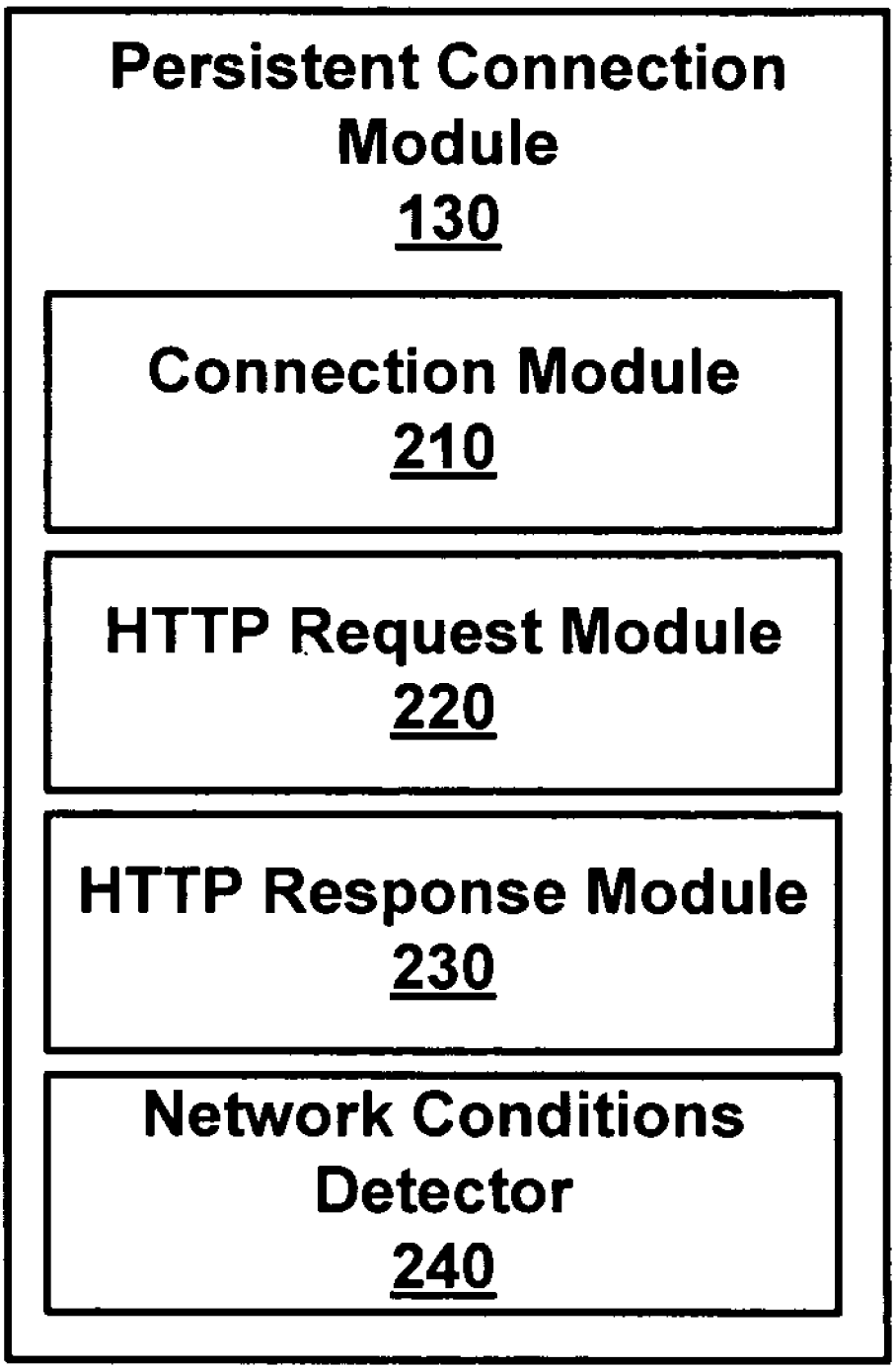
FIG. 2 is a block diagram illustrating a persistent connection module of the system according to some embodiments of the present invention.

FIG. 2 is a block diagram illustrating a persistent connection module 130 of the system 100 according to some embodiments of the present invention. The persistent connection module 130 comprises a connection module 210, an HTTP request module 220, an HTTP response module 230, and a network conditions detector 240. There are generally four steps in HTTP communications initiated by the client 110 to the server 120: establish a TCP connection, send an HTTP request, send an HTTP response, and terminate the TCP connection.

The connection module 210 establishes a TCP connection by sending a request from the client 110 to the server 120. Accordingly, the TCP connection is opened to allow the client 110 to make multiple HTTP requests and to allow the server 120 to send multiple HTTP responses before terminating. The TCP connection can be opened on a port such as port 80. Because either one or both of the an HTTP request module 220 and the response module 230 operate to continually send HTTP requests and/or responses to prevent termination of the TCP connection, the connection module 210 waits until the (OSI application layer) connection using HTTP is expired before terminating the (transport layer) TCP connection.

The HTTP request module 220 provides an HTTP request from the client 110 to the server 120. In one embodiment, the HTTP request module 220 initiates the persistent connection using HTTP. The HTTP request module 220 determines an estimated period of time that the client 110 and the server 120 will maintain the connection based on the content length value. Prior to the expiration of the period, the HTTP request module 220 generates an additional HTTP request, having a modified content length value. In one embodiment, the HTTP request module 220 receives notification that a connection was prematurely closed, and in response, adjusts its operation. In one embodiment, the content length value can be increased to increase the time period that the client 110 and the server 120 will keep a connection open. In another embodiment, the estimated period is reduced so that HTTP requests are sent at a higher rate.

Figure 3A:
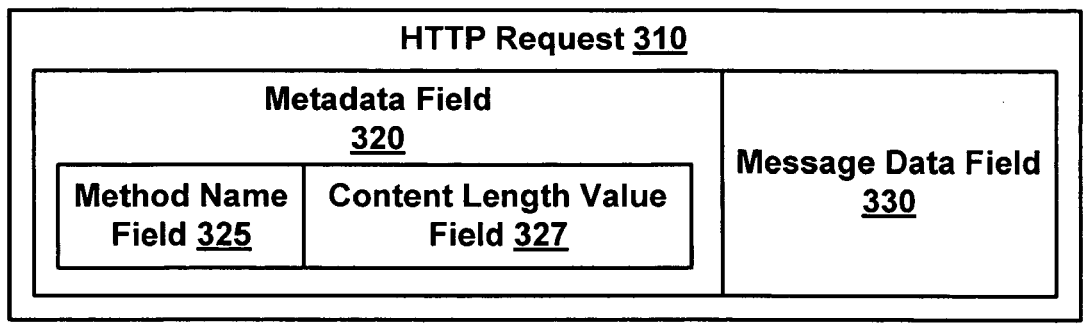
FIGS. 3a,b are schematic diagrams illustrating an HTTP request and an HTTP response according to some embodiments of the present invention.

An exemplary HTTP request 310 is shown in FIG. 3a. The HTTP request 310 comprises a metadata field 320 and a message data field 330. The metadata field 320 in one embodiment is referred to as an initial, or status, line. The metadata field 320 can include a method name field 325 along with other information such as a local path of the requested resource (i.e., a URL), a version of HTTP being used (e.g., HTTP 1.0), and other information. The method name 325 indicates the type of transaction requested, such as a GET or POST action. The metadata field 320, in some embodiments, includes a content length field 327 and also includes a content encoding and a content type. The content length field 327 includes a value that indicates a size of the message data field 330 (e.g., size can be expressed as a decimal number of octets). For example, when the method type is a POST action, the value in of the content length field 327 indicates how much message data is being sent from the client 110 to the server 120. The HTTP request module 220 can adjust the value of the content length field 327 to maintain the HTTP connection for a certain time period. The content encoding describes the type of encoding and the content type describes the media type.

Referring again to FIG. 2, the HTTP response module 230 provides an HTTP response from the server 120 to the client 110. In a first embodiment, the HTTP response module 230 passively maintains the persistent HTTP connection by reacting to the HTTP requests received from the client 110. In a second embodiment, the response module 230 actively maintains the persistent HTTP connection by estimating the period of time that the connection will be kept open based on the content length value, and/or modifying the content length value. As with the request module 220, the response module 230 adjusts the parameters responsive to a premature termination of the connection.

Figure 3B:
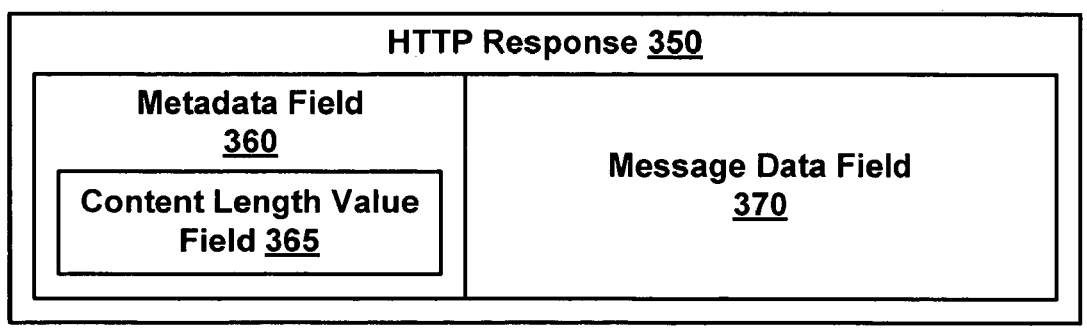

An exemplary HTTP response 350 is shown in FIG. 3b. The HTTP request 350 comprises a metadata field 360 and a message data field 370. The metadata field 360 can include an initial (or status) line to store versions and codes, and header lines. The message data field 370 can store data responsive to, for example, the GET action. For example, the message data field 370 can include HTML code in response to an HTTP request 310 for a URL.

In FIG. 2, the HTTP request and response modules 220, 230 can use HTTP headers, such as GET and POST, during communications. The GET command is a request from the client 110 to the server 120 to send data. The POST command allows the client 110 to send data to the server 120. The content-length header can be a required header in HTTP when using the GET or POST commands, the lack thereof leading to a '411 length required' error. Generally, the content length value specifies how many bytes of data are expected for transmission. In one embodiment, the communications module 116 receives a content-length value from the persistent connection module 130a.

Optionally, the network conditions detector 240 provides a feedback of network conditions associated with the network 106 (shown in FIG. 1) to the HTTP request and response modules 220, 230. In one embodiment, the network conditions can be received from a node on the network. In another embodiment, the network conditions can be calculated using various interrogatories such as a ping request to measure the amount of time that it takes for a packet to travel from, for example, the client 110 to the server 120.

Figure 4:
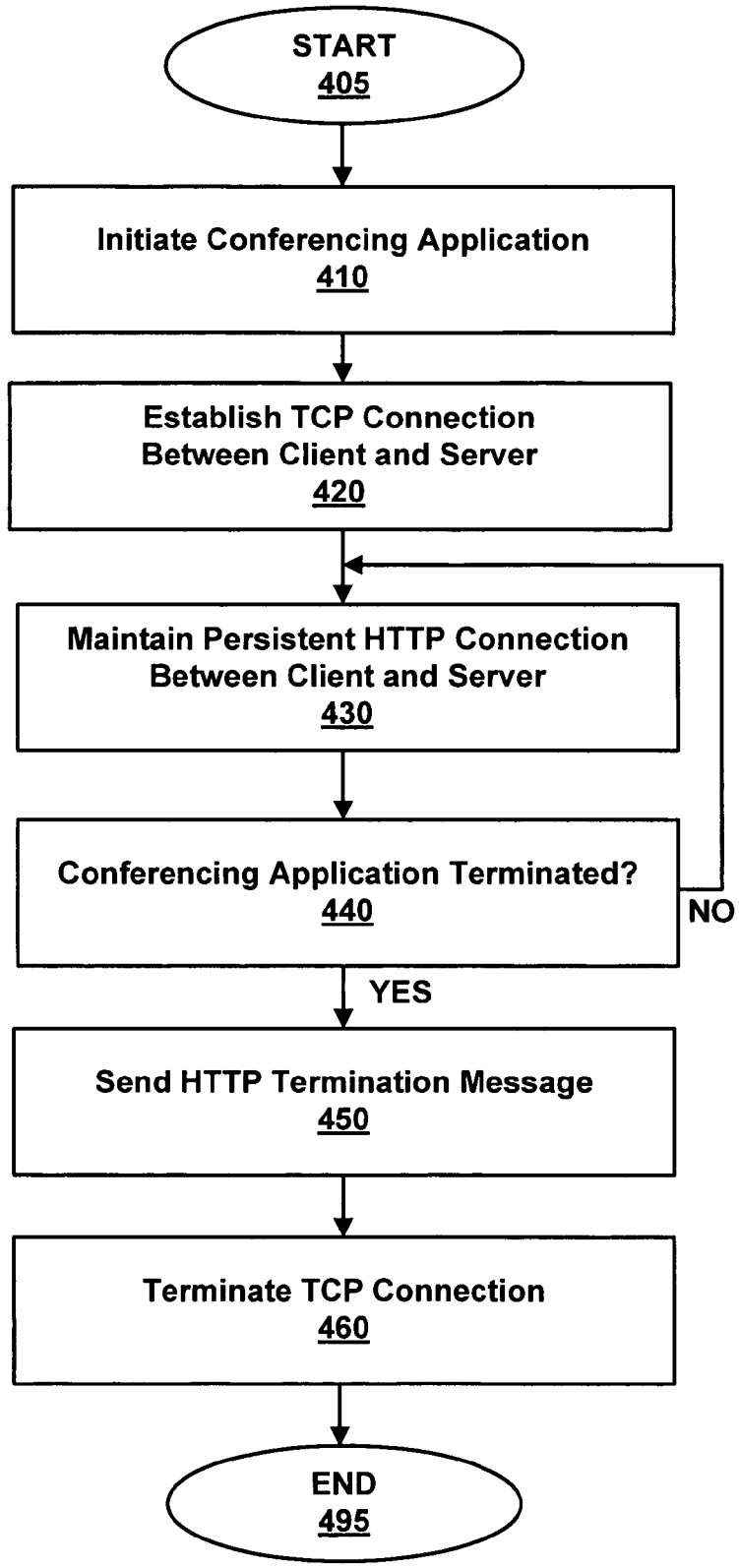
FIG. 4 is a flow chart illustrating a method for maintaining a persistent HTTP connection according to some embodiments of the present invention.

FIG. 4 is a flow chart illustrating a method 400 for emulating a persistent connection using HTTP according to one embodiment of the present invention. A conferencing application, or other application (e.g., application 112, 122) is initiated 410 by, for example, a client 110 or the server 120. The conferencing application can indicate that a persistent connection is desired, or the persistent connection can be automatically activated.

A TCP connection is established 420 between client and server to provide a communication channel for the conferencing application (e.g., between client 110 and server 120 by connection module 210). Using the TCP connection, a persistent HTTP connection is maintained 430 between the client and the server. In one embodiment, the client maintains a persistent connection with the server by modifying values of the content length parameter in HTTP requests (e.g., HTTP request module 220 modifying content length value field 327) sent to the server. A client initiated persistent connection is described in further detail below in association with FIG. 5. In another embodiment, the server maintains a persistent connection with the client by modifying values of the content length parameter in HTTP responses (e.g. HTTP response module 230 modifying content length value field 365) returned to the client. A server initiated persistent connection is described in further detail below in association with FIG. 6. In yet another embodiment, both the client and the server contribute to maintaining a persistent connection. In one embodiment, the persistent connection may be implemented using additional protocols, such as the Secure Socket Layer (SSL) protocol.

The connection remains active until the conferencing application is terminated 440. Once the conferencing application is terminated, a message can be sent 450 to the persistent connection module. The TCP connection can be terminated 460 by the communication module.

Figure 5:
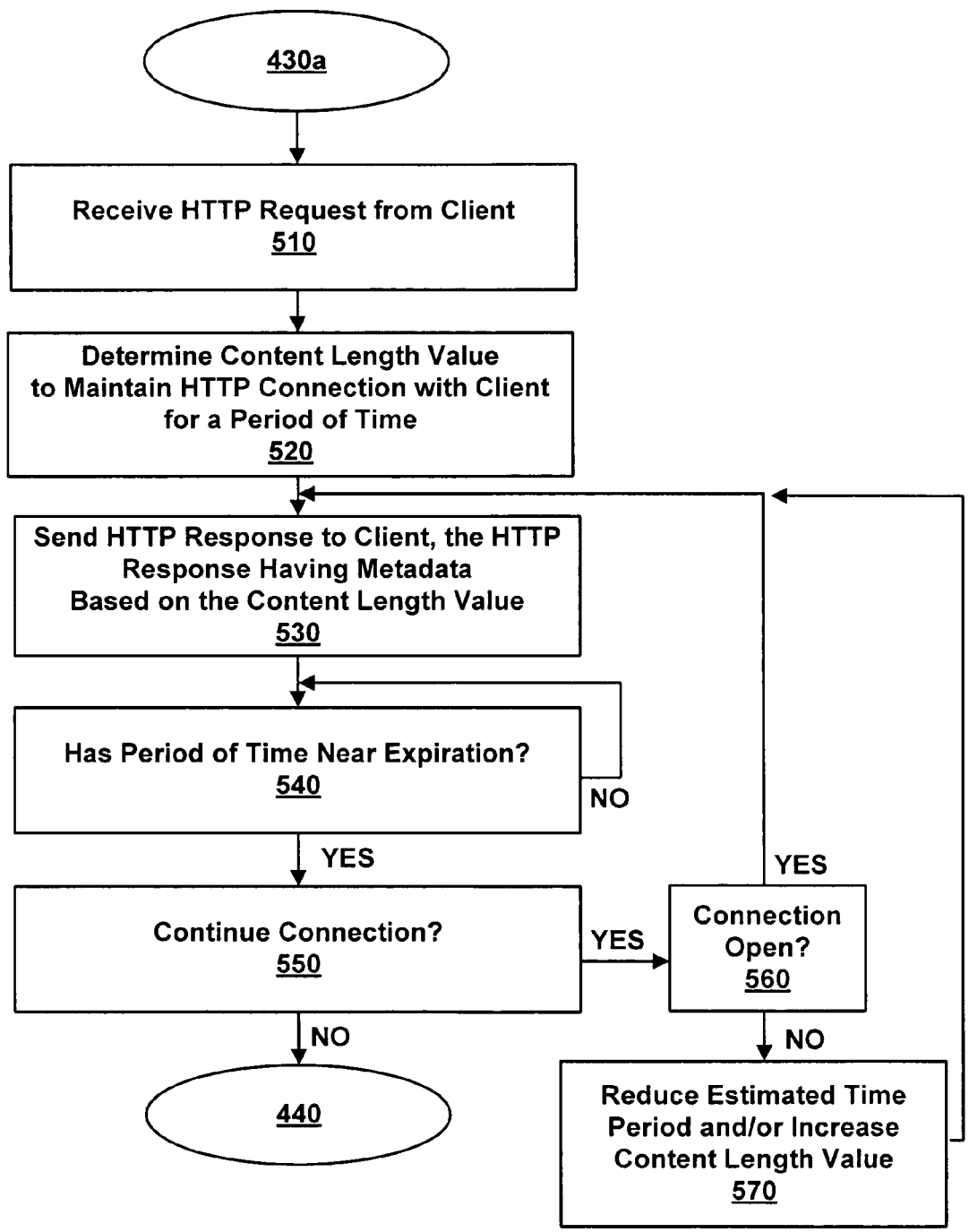
FIG. 5 is a flow chart illustrating a method for, in a client, maintaining a persistent HTTP connection with a server according to some embodiments of the present invention.

FIG. 5 is a flow chart illustrating a method 430a for maintaining a persistent connection by a server according to one embodiment of the present invention. The server receives 510 an HTTP request from the client. In one embodiment, the HTTP request has not been modified by the client.

The response module determines 520 a content length value (e.g., as illustrated in example below in Table 1) to maintain a persistent HTTP connection with the client for a (theoretical) period of time. The (predetermined or) implemented period can default to various values (typically equal to half the theoretical time period), such as one second for responses. The response module can reduce the time period and/or increase the content length value, responsive to a premature closure (i.e. without receiving a terminate-connection message) of the persistent connection using HTTP. Optionally, the response module can make adjustments responsive to network conditions. For example, as illustrated in Table 1, a higher bandwidth can lead to a reduced time period (e.g., by 25%) and an increased content length value (e.g., from 32 kBytes to 64 kBytes) in order to maintain the connection using HTTP. The HTTP response is sent 530 using, for example, a GET or POST action including the content length value.

TABLE 1

| Network Bandwidth (kBaud) | Theoretical Time Period (second) | Implemented Time Period (second) | Content Length Value (kBytes) |
| --- | --- | --- | --- |
| 9.6 | 10 | 5 | 12 |
| 56 | 4 | 2 | 28 |
| 128 | 2 | 1 | 32 |
| 512 | 1 | 0.5 | 64 |
| 1,500 | 0.6 | 0.3 | 128 |

When the time period nears expiration 540, and no message for termination of the connection using HTTP has been received 550, the period is renewed or reestablished. If the connection is successfully maintained as open 560, the content length value can be used again. On the other hand, if the connection is prematurely closed 560 (i.e. without receiving a terminate connection message), the amount of time in the period is then reduced 570, and/or the content length value can be increased.

In some embodiments, the HTTP responses have no data (other than metadata) because they are generated only for the purpose of maintaining the connection using HTTP. In other embodiments, the HTTP responses include legitimate data being transferred between the server and the client. In still other embodiments, HTTP responses used merely to maintain the HTTP connection include random data in case, for example, a proxy server examines the HTTP responses to make sure that data is being transferred.

Figure 6:
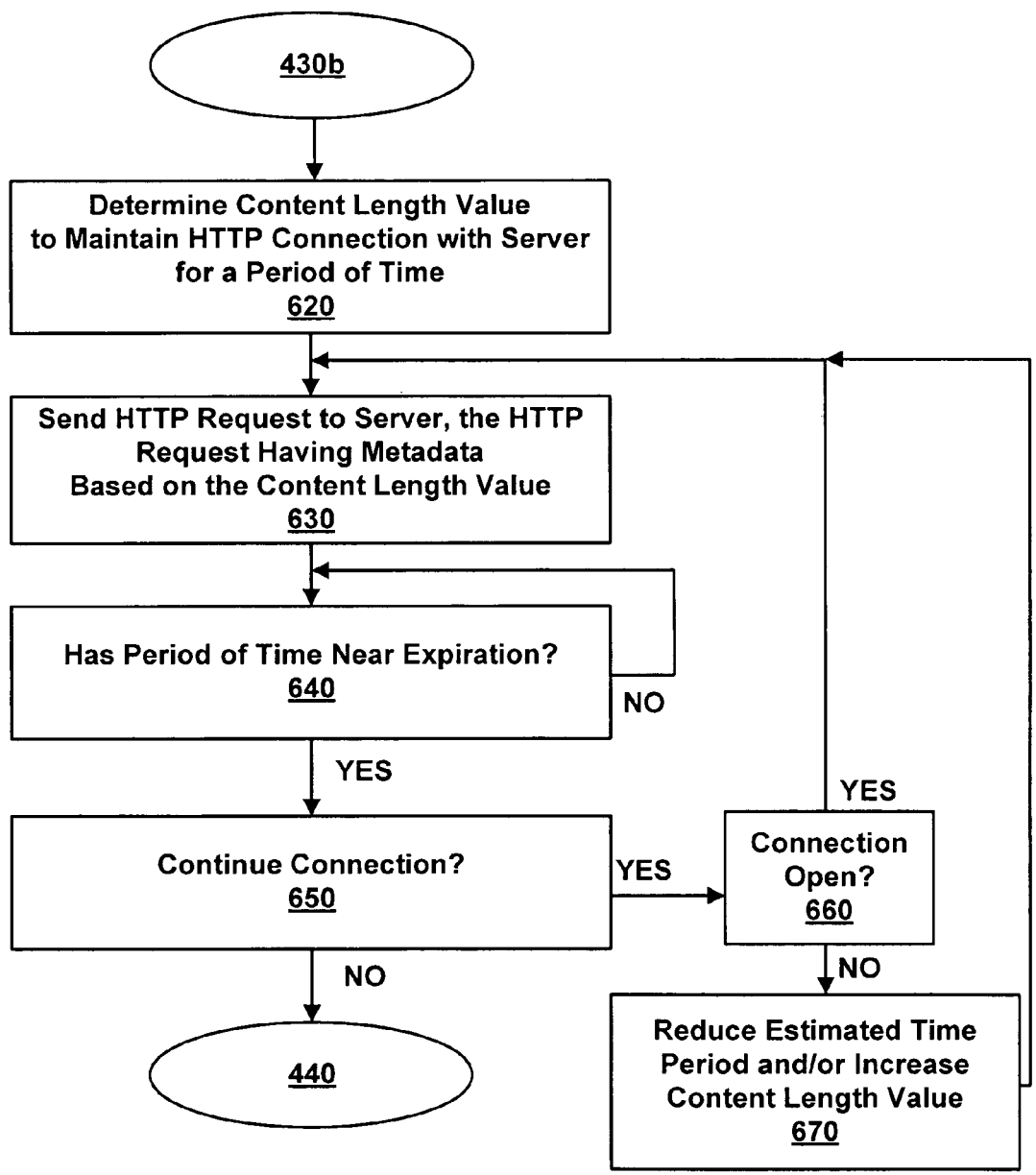
FIG. 6 is a flow chart illustrating a method for, in the server, maintaining a persistent HTTP connection with the client according to some embodiments of the present invention.

FIG. 6 is a flow chart illustrating a method 430b for maintaining a persistent connection by a client according to one embodiment of the present invention. The request module determines 620 a content length value to maintain an HTTP connection with the server for a (theoretical) period of time. The period can default to various values. The HTTP request module 220 can then reduce the amount of time in the period and/or increase the content length value, responsive to a premature closure (i.e. without receiving a terminate-connection message) of the HTTP connection. Optionally, the request module can make adjustments responsive to network conditions. The HTTP request is sent 630 using, for example, a GET or POST action including the content length value.

The client sends 630 the HTTP request to the server. In one embodiment, the server sends an HTTP response to the request without modification of the content length value. In another embodiment where the server also maintains the persistent connection, the server can adjust the content length value.

Before the time period expires 640, a query 650 can be made to continue the connection. If the connection has been prematurely closed 660 (i.e. without receiving a terminate connection message), the amount of time in the period can be reduced 670, and/or the content length value can be increased. Another HTTP request is sent 630 to reestablish and maintain the connection, as illustrated in loop 630-660.

Other variations of the systems and methods described herein are possible. For example, in one embodiment, rather than just one device doing so, both the client and the server can work to maintain persistent connection.

In another embodiment that includes a proxy server between the client and the server, the client can maintain a persistent connection with the proxy server. Generally, the proxy server can insulate the client to an internal network while accessing resources on an external network on behalf of the client. Accordingly, the client makes requests of various servers through the same persistent connection with the proxy server. In one embodiment, the client can cause the proxy server to maintain a connection with a specific server on the external network In one embodiment, HTTP requests can be pipelined over a persistent connection. Specifically, multiple HTTP requests can be sent without receiving an HTTP response. Likewise, multiple HTTP responses can be sent to a single HTTP request.

The order in which the steps of the methods of the present invention are performed is purely illustrative in nature. The steps can be performed in any order or in parallel; unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention. For example, the systems and methods of the present invention can be used to establish a connection between a client computer and a server computer using any type of stateless protocol, not just the HTTP protocol.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared; and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer-implemented method for maintaining a persistent Hypertext Transfer Protocol (HTTP) connection between a client and a server, comprising:
    establishing a Transmission Control Protocol (TCP) connection;
    receiving an HTTP request;
    determining a content length value that maintains the connection using HTTP for a predetermined period of time, the content length value being adjusted based on both a network bandwidth between the client and the server and the predetermined period of time;
    generating HTTP responses to the HTTP request, each response including the content length value; and
    sending the HTTP responses to the HTTP request prior to expiration of the predetermined period of time associated with a previous HTTP response to the HTTP request.

2. The method of claim 1, wherein generating responses comprises:
    continually generating responses to the HTTP request until a message is received to terminate the connection.

3. The method of claim 1, wherein sending HTTP responses comprises:
    sending the HTTP responses to the client wherein the client does not explicitly support persistent connections.

4. The method of claim 1, wherein sending HTTP responses comprises:
    sending the HTTP responses to the client without using Keep-Alive headers.

5. The method of claim 1, wherein the connection is maintained independent of a number of HTTP transactions that occur.

6. The method of claim 1, further comprising:
    sending a ping; and
    responsive to failing to receive a ping response, terminating the connection.

7. The method of claim 1, further comprising:
    detecting that the connection has been prematurely terminated;
    reestablishing the connection;
    reducing the predetermined period of time; and
    adjusting the content length value for the reduced predetermined period of time.

8. The method of claim 1, wherein establishing the connection comprises
establishing the connection responsive to initiation of an application transferring data in approximately real time.

9. The method of claim 1, further comprising:
sending data over the connection, the amount of data being unrelated to the content length value.

10. The method of claim 1, wherein the HTTP response includes the content length value, as determined by the server, to maintain the HTTP connection with the client for the predetermined period of time.

11. The method of claim 1, wherein the HTTP request includes the content length value, as determined by the client, to maintain the HTTP connection using HTTP with the server for the predetermined period of time.

12. The method of claim 1, wherein the HTTP request is one of a GET request and a POST request.

13. The method of claim 1, wherein at least one of the client and the server uses version 1.0 of the HTTP protocol for HTTP communications.

14. The method of claim 1, wherein at least one of the client and the server uses version 1.1 of the HTTP protocol for HTTP communications.

15. The method of claim 1, further comprising:
encrypting the HTTP responses to the HTTP request.

16. A computer-implemented method for maintaining a persistent connection using HTTP with a server from a client, comprising:
establishing a connection;
sending HTTP requests, each HTTP request including a content length value determined to maintain the connection for a predetermined period of time, the content length value being adjusted based on both a network bandwidth between the client and the server and the predetermined period of time; and
sending the HTTP requests prior to expiration of the predetermined period of time associated with a previous HTTP request.

17. The method of claim 16, wherein sending HTTP requests comprises:
sending the HTTP requests to the server wherein the server does not explicitly support persistent connections.

18. The method of claim 16, wherein sending HTTP requests comprises:
sending the HTTP requests to the server without using Keep-Alive headers.

19. A system for maintaining a persistent HTTP connection with a client from a server, comprising:
a client;
a server, in communication with and configured to establish a connection with the client, the server configured to generate responses to a HTTP request that is received from the client, each response including a content length value that maintains the connection for a predetermined period of time, the content length value being adjusted based on both a network bandwidth between the client and the server and the predetermined period of time, the server configured to send the responses to the HTTP request prior to expiration of the predetermined period of time associated with a previous response to the HTTP request.

20. A system for maintaining a persistent HTTP connection with a server from a client, comprising:
a server;
a client, in communication with and configured to establish a connection with the server, the client configured to generate HTTP requests that are sent to the server, each HTTP request including a content length value that maintains the connection for a predetermined period of time, the content length value being adjusted based on both a network bandwidth between the client and the server and the predetermined period of time, the client configured to send the HTTP requests prior to expiration of the predetermined amount of time associated with a previous HTTP request.

21. The system of claim 20, wherein the server is a proxy server that communicates with an external network on behalf of the client, and wherein the HTTP requests received over the persistent HTTP connection are directed to more than one server on the external network.

* * * * *

UNITED STATES PATENT AND TRADEMARK OFFICE
CERTIFICATE OF CORRECTION

PATENT NO. : 7,577,749 B1  
APPLICATION NO. : 11/294905  
DATED : August 18, 2009  
INVENTOR(S) : James Long Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Seventh Day of September, 2010

David J. Kappos
*Director of the United States Patent and Trademark Office*